(12) United States Patent
Kulbeth

(10) Patent No.: US 7,514,011 B2
(45) Date of Patent: Apr. 7, 2009

(54) SYSTEM FOR SEPARATING SOLIDS FROM A FLUID STREAM

(75) Inventor: Robert M. Kulbeth, Carencro, LA (US)

(73) Assignee: Del Corporation, Scott, LA (US)

( * ) Notice: Subject to any disclaimer, the term of this patent is extended or adjusted under 35 U.S.C. 154(b) by 363 days.

(21) Appl. No.: 10/954,058

(22) Filed: Sep. 29, 2004

(65) Prior Publication Data

US 2005/0040119 A1 Feb. 24, 2005

Related U.S. Application Data

(60) Continuation-in-part of application No. 10/288,408, filed on Nov. 4, 2002, now Pat. No. 6,808,626, which is a division of application No. 09/846,974, filed on May 1, 2001, now Pat. No. 6,506,310.

(51) Int. Cl.
*E21B 21/06* (2006.01)

(52) U.S. Cl. ............... 210/780; 210/297; 210/298; 210/304; 210/305; 210/319; 210/388; 210/416.1; 210/512.1; 210/523; 210/241; 210/787; 210/803; 210/804; 210/805; 209/17; 209/172.5; 209/173; 209/725; 209/910; 209/913; 209/920; 175/206

(58) Field of Classification Search ............... None
See application file for complete search history.

(56) References Cited

U.S. PATENT DOCUMENTS

| | | |
|---|---|---|
| 3,347,373 A | 10/1967 | Dahlberg |
| 3,630,011 A | 12/1971 | Dunn |
| 4,090,523 A | 5/1978 | Kelly, Jr. et al. |
| 4,152,255 A | 5/1979 | Musschoot |
| 4,255,269 A | 3/1981 | Timmer |
| 4,272,366 A | 6/1981 | Dean et al. |
| 4,457,839 A | 7/1984 | Bailey |
| 4,459,207 A | 7/1984 | Young |
| 4,474,254 A | 10/1984 | Etter et al. |
| 4,634,535 A | 1/1987 | Lott |
| 4,750,920 A | 6/1988 | Manuel et al. |
| 4,911,834 A | 3/1990 | Murphy |
| 5,164,158 A | 11/1992 | Brashears et al. |
| 5,203,614 A | 4/1993 | Robbins et al. |
| 5,361,998 A | 11/1994 | Sirevag et al. |

(Continued)

*Primary Examiner*—Robert James Popovics
(74) *Attorney, Agent, or Firm*—Jones Walker

(57) ABSTRACT

A system for separating solids from a fluid stream. The system includes a first separator device mounted to a container. The container includes a settling compartment and baffle plate module, with the initial settling compartment receiving the fluid from the first separator device. The fluid stream proceeds through the baffle plate module. The solids within the fluid stream will descend to the bottom of the container. A spiral blade is positioned at the bottom of the container, with the spiral blade adapted to convey solids to a first pump member. The speed of rotation of the spiral blade may be varied. The first pump member discharges the slurry to a second separator device. The second separator device will discharge the separated fluid stream into the baffle plate module. In one embodiment, the first separator device is a linear shaker and the second separator device is a cyclone separator and linear shaker mounted in tandem. The fluid exiting the baffle plate module may be directed into a mixing compartment, with the mixing compartment being part of the container. A method of separating solids from a fluid stream is also disclosed.

15 Claims, 9 Drawing Sheets

U.S. PATENT DOCUMENTS

| | | | |
|---|---|---|---|
| 5,853,583 A | 12/1998 | Shah | |
| 6,506,310 B2 * | 1/2003 | Kulbeth | 210/780 |
| 6,530,482 B1 | 3/2003 | Wiseman | |
| 6,533,946 B2 | 3/2003 | Pullman | |
| 6,808,354 B1 * | 10/2004 | Kulbeth | 414/326 |
| 6,808,626 B2 * | 10/2004 | Kulbeth | 210/241 |
| 6,976,819 B2 * | 12/2005 | Kulbeth | 414/326 |
| 2002/0162807 A1 * | 11/2002 | Kulbeth | 210/804 |
| 2003/0062325 A1 * | 4/2003 | Kulbeth | 210/804 |
| 2004/0208732 A1 * | 10/2004 | Kulbeth | 414/326 |
| 2005/0040119 A1 * | 2/2005 | Kulbeth | 210/806 |
| 2005/0042064 A1 * | 2/2005 | Kulbeth | 414/319 |

* cited by examiner

SYSTEM FOR SEPARATING SOLIDS FROM A FLUID STREAM

This application is a continuation-in-part of my co-pending application bearing Ser. No. 10/288,408, filed on 4 Nov. 2002, now U.S. Pat. No. 6,808,626 which is a division of application Ser. No. 09/846,974, filed on 1 May 2001, now U.S. Pat. No. 6,506,310.

BACKGROUND OF THE INVENTION

This invention relates to a system for treating fluid streams. More particularly, but not by way of limitation, this invention relates to a system and method for separating solids from a fluid stream.

In industrial applications, a fluid stream may contain solids. The solids may be suspended in solution. The particle sizes may range from larger diameter solids to extremely small diameter solids. As those of ordinary skill in the art will recognize, it is desirable to separate the solids from the fluid. For instance, environmental regulations may require that operators separate the solids from a slurry. Additionally, the operator may wish to reuse the base fluid, and hence, the fluid must be purged of solids.

As an example in the drilling industry, the well being drilled contains cuttings from the subterranean well bore. The fluid being used to drill the well is an expensive, chemically enhanced fluid. Therefore, operators wish to salvage the base fluid for reuse.

Regardless of the specific application, there is a need for a system and method to separate solids from fluid streams. Prior art devices suffer from many deficiencies. Prior art systems do not allow for adequate separation of solids from the fluid. The present systems are not packaged in an efficient and well-organized manner. The prior art systems are bulky and can't be transported from site to site in a single package. The present invention allows the packaging of the system on a frame that can be integrated with a trailer allowing for portability and mobility. Therefore, there is a need for a system and method to efficiently handle and separate solids from a fluid stream. There is also a need to add bulk materials to a recently separated fluid stream. These needs, as well as many other needs, will be met by the novel invention herein disclosed.

SUMMARY OF THE INVENTION

A system for separating solids from a fluid stream is disclosed. The system comprises a first shaker adapted to a container, and a settling tank positioned to receive the liquid discharged from the first shaker. The system will also include a first baffle module positioned at the output of the settling tank, with the first baffle module having a discharge opening. The fluid stream proceeds through the container in a first direction. A spiral blade is positioned at the bottom of the container, with the spiral blade adapted to convey the solids in a second direction. The spiral blade will have a controller member that varies the speed of rotation of the spiral blade.

A first pump member is provided, with the first pump member receiving the solids from the spiral blade, along with a first cyclone device that receives the discharge from the first pump member outlet and delivers a separated fluid stream to the initial settling compartment. The solids are discharged to a linear shaker. The linear shaker discharges the separated fluid back into baffle plate module via the open top of the container. In the preferred embodiment, the first baffle module comprises a plurality of baffle plates titled at an angle between 45 degrees to 70 degrees.

Additionally, the system may contain a second pump member that has an input line operatively associated to the bottom of the container to receive the solids and an output line operatively associated with a second tandem cyclone device and linear shaker. The liquid output from the cyclone device is channeled to the initial settling compartment and the solids output from the cyclone device is channeled to the screen of the linear shaker. The collected solids from the screen of the linear shaker is collected to a bin and the fluid falls through the screen and into the baffle plate module.

The system may also comprise a first weir positioned at the first baffle module and a second baffle module positioned adjacent the first baffle module. Additionally, the container may include a mixing compartment operatively connected to the discharge line from the baffle plate modules, the mixing compartment having a hopper and a mixing blade disposed therein. In the preferred embodiment, the container is mounted to a base frame having a set of wheels for mobile transportation. A pump member is operatively associated with the mixing compartment, with the pump member having a suction line from within the mixing container and a discharge line within the mixing compartment.

A method of filtering a fluid containing solids is also disclosed. The method includes flowing the fluid into a first separating means for separating the fluid from the solids and channeling the first cut fluid into an initial settling compartment of a container. Next, the fluid is channeled into a second compartment, with the second compartment containing a plurality of baffle plates. Some of the solids remaining in solution will strike the baffle plates, which in turn will cause the solids to settle to the bottom of the container.

The method further includes conveying the solids to a first discharge pump and discharging the slurry to a second separating means for separating the fluid from the solids, and wherein the solids are further separated from the fluid. Next, the fluid is discharged into the second compartment which in turn will cause the solids to travel through the baffle plates thereby causing the suspended solids to strike the baffle plates. Some of the solids remaining in solution will settle to the bottom of the container and will in turn be conveyed to the first discharge pump. The solids can then be discharged to the second separating means thereby further separating the fluid from the solids. The fluid is exited from the container, and in particular, the fluid stream is exited from the baffle plate compartment.

In one embodiment, the first separating means comprises a linear shaker and the method includes collecting the solids into a bin. Additionally, the second separating means comprises a cyclone separator in tandem with a linear shaker device and the method includes collecting the solids in the bin. The third separating means may comprise a cyclone separator in tandem with a linear shaker means and the method includes collecting the solids into the bin.

In one embodiment, the step of conveying the solids to the first discharge pump includes providing an auger blade placed in the bottom of the container and rotating the auger blade so that the solids are pushed to an inlet for the first discharge pump. The spiral blade can be rotated at a variable speed in order to vary the solids concentration of the slurry to the cyclone separators. In the preferred embodiment, the baffle plates are disposed at an angel of between 45 degrees to 70 degrees. Additionally, the method may further comprise mixing an additive and/or bulk material to the fluid within a mixing compartment. The method may also include suctioning from either the container or mixing compartment and pumping back into the mixing compartment in order to mix the fluid stream with an additive.

An advantage of the present invention includes having a modular design wherein a component of the system may be added or removed from the system. Another advantage is the system may be transported easily from one location to another location. For instance, the frame may be lifted via a crane onto vessels, barges, flat beds, etc. Also, the frame may include wheels so that the entire system can be transported via a vehicle such as a truck.

Another advantage is that the novel system and method will remove solids from five (5) microns and larger in some applications. Still yet another advantage is that the system allows for redundancies in that the fluid stream is introduced to multiple separation devices such as the linear shaker, weir, baffles, cyclone separators, settling tanks, etc. Additionally, the fluid stream can be continuously recycled through the system until the desired level of filtration is achieved.

Further, it is desirable to have the solids thus collected to be essentially fluid-free. Another advantage is that the solids thus recovered contain very little in-situ fluid.

A feature of the present invention includes having a linear shaker that separates large diameter solids from the fluid stream. Another feature is the option to use other types of shakers, such as orbital shakers that can also separate small diameter solids from the fluid stream. Yet another feature is the mixing compartment that can be added to the system for the mixing of bulk materials and/or additives to the fluid stream.

Still yet another feature includes use of an auger type of device for conveying the solids to a pump member. In the preferred embodiment, the auger type of device is a spiral blade without the shaft. The speed of the rotation of the auger blade can be varied depending on the nature of the slurry and the desired process rate of the fluid stream. Thus, a feature includes decreasing or increasing the rotation rate of the spiral blade in order to meet processing rate goals. Another feature includes use of baffles in a baffle module, with the baffle plates being tilted to maximize the impact of the suspended solids during fluid flow as well as to provide the proper orientation for fluid flow through the container.

DETAILED DESCRIPTION OF THE PREFERRED EMBODIMENT

Figure 1:
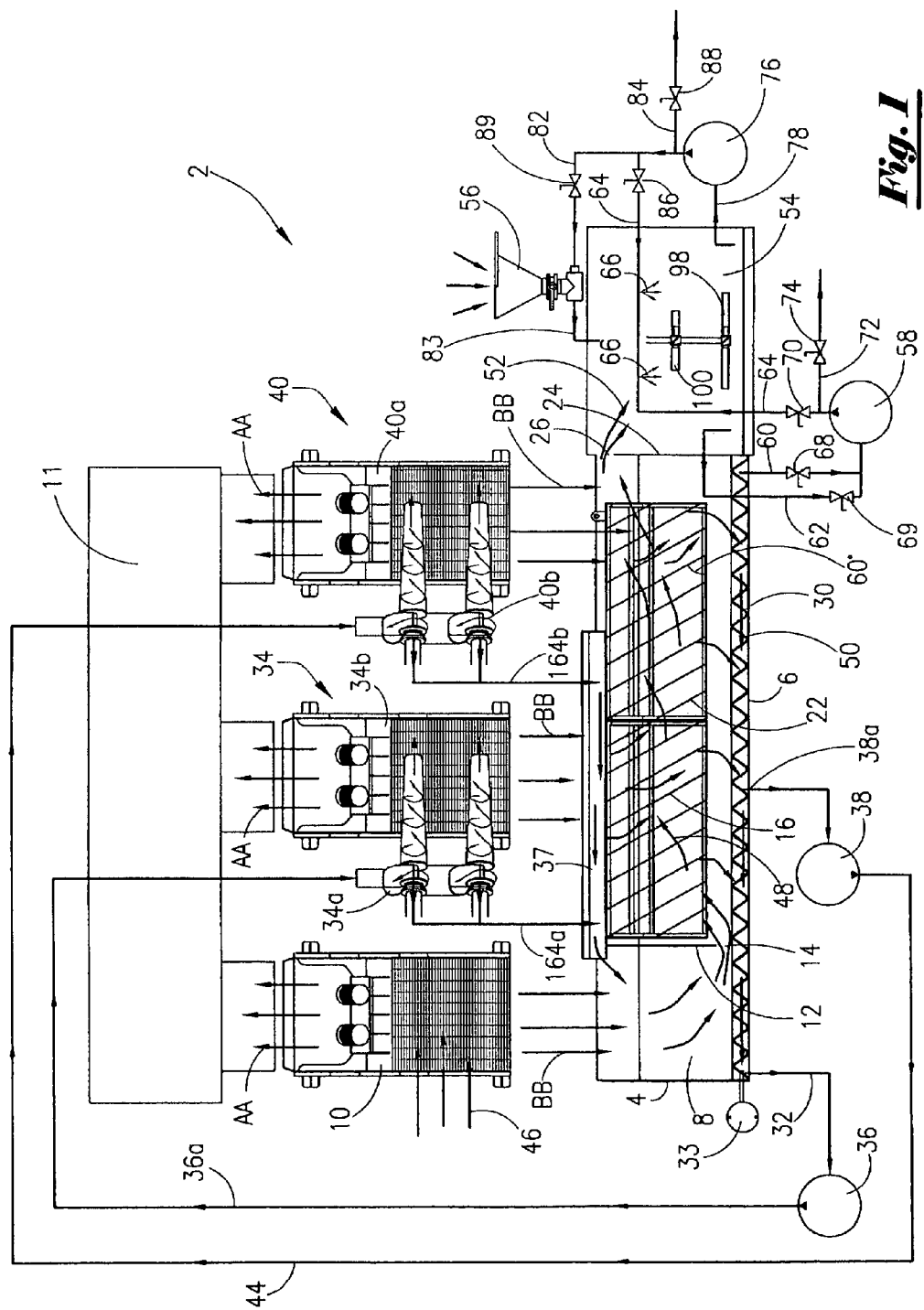
FIG. 1 is a schematic diagram of the preferred embodiment of the present invention.

Referring now to FIG. 1, a schematic diagram of the preferred embodiment of the present invention will now be described. The system 2 seen in FIG. 1 includes a container seen generally at 4. The container 4 has generally a bottom 6, two side walls, an open top, and two end walls. The two side walls and bottom 6 are configured in a "V" bottom shape as is well understood by those of ordinary skill in the art.

In a first compartment within the container 4, there is contained an initial settling compartment 8. The initial settling compartment 8 has situated above it the linear shaker 10, and wherein the linear shaker originally receives the fluid stream. The linear shaker 10 is commercially available from Fluid Systems, Inc. under the name Linear Shaker. The linear shaker 10 is sometimes referred to as the scalping shaker since it makes the initial cut i.e. initially scalps the fluid stream of solids. It should be noted that the general fluid flow or solids flow through the system 2 is denoted by the flow arrows.

The fluid stream initially flowing over the scalping shaker 10 will have the solids suspended therein. The fluid stream may have originated from an oil and gas well bore, a directional bore hole being drilled for highway and/or bridge construction, waste streams from industrial applications, waste water treatment, tank cleaning, utility construction, etc. The invention can be used for any application where the operator wishes to separate and segregate the solids from a fluid stream.

The scalping shaker 10 will make an initial cut of the solids from the fluid stream. As those of ordinary skill will appreciate, the shaker 10 has a dual output, with the first output being primarily solids and the second output being primarily the fluid stream. The larger solids and debris are screened and discarded off the side of the tank to a bin 11. Nevertheless, the fluid stream from the second output will continue to have solids suspended therein. As seen in FIG. 1, the solids screened with the shakers are denoted by the arrows AA. The fluid which falls through the screen is denoted by the arrows BB.

As those of ordinary skill in the art will appreciate, separation techniques using shakers and cyclone separators are efficient but not perfect. In other words, by running the fluid streams through each separator means, a portion of the solids is removed during each cut. The larger diameter solids are removed first, followed by successively smaller diameter solids. The system herein disclosed allows for certain redundancies in order to achieve a desired level of separation.

In the embodiment depicted in FIG. 1, the container 4 will also contain an underflow weir 12 positioned within the container, with the underflow weir 12 having an opening extending from the tank bottom 6 to the weir 12 that is two feet wide. Thus, the fluid will travel through the space indicated by the numeral 14. The baffle plate module, which is seen generally at 16, is positioned to receive the fluid stream from the initial settling compartment 8. The baffle plate module 16 comprises a plurality of baffle plates seen generally in FIG. 9 as plates 16a, 16b, 16c, 16d, 16e, 16f, 16g, 16h, 16i. The baffle plates are tilted at a preferred angle of between 45 degrees to 70 degrees relative to the horizontal ground reference level, with a most preferred angle of 60 degrees as seen in FIG. 1. The baffle plates are tilted so that as the fluid stream flows through the container, the suspended solids will strike the baffle plates, decreasing the velocity of the solids and allowing gravity to force the solids to the bottom 6. As shown in FIG. 1, the baffle plates are tilted in the direction of the fluid flow through the container 4. The solids which fall to the bottom may be referred to as a slurry since the solids still contain an in-situ fluid.

Figure 9:
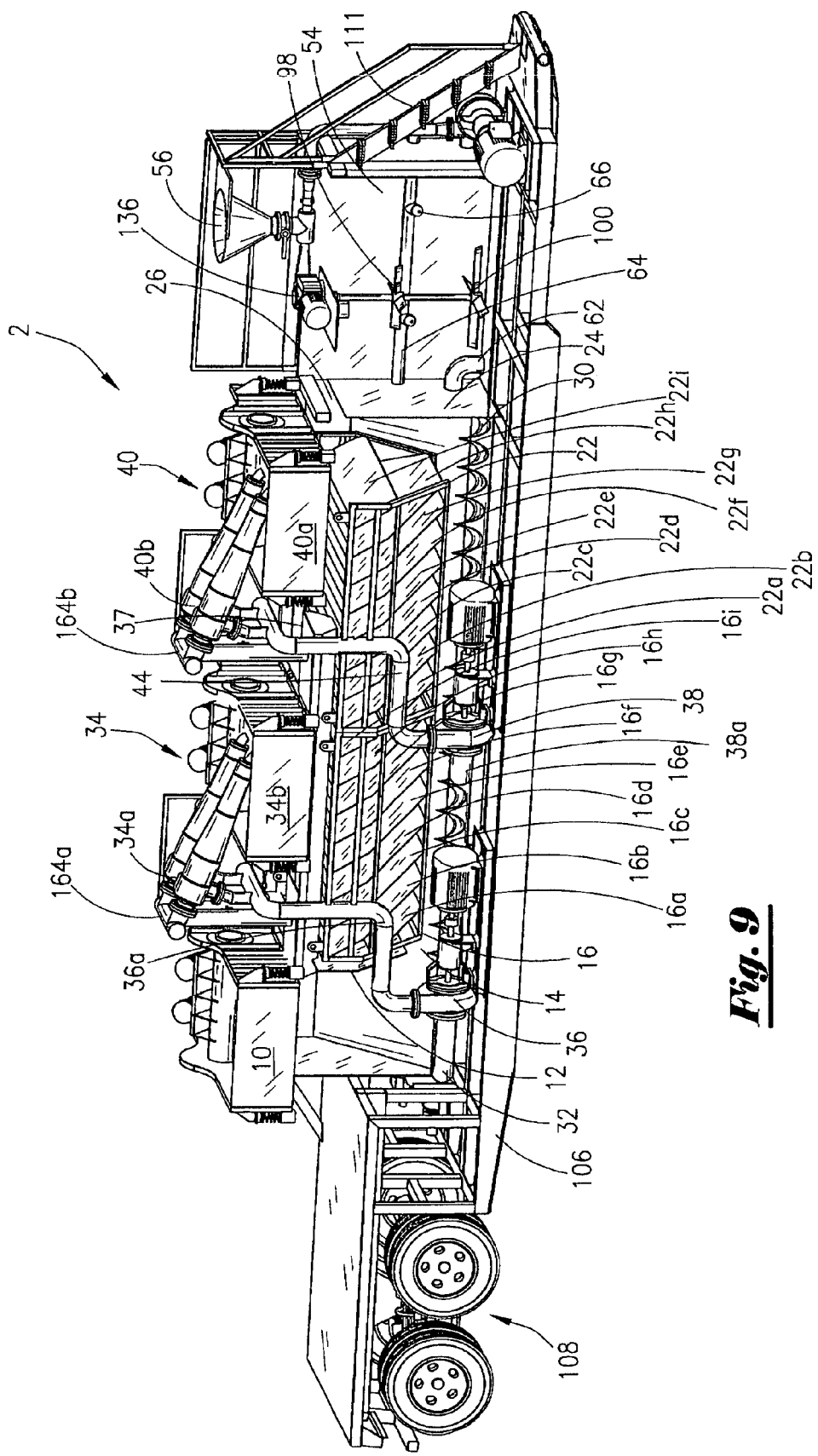
FIG. 9 is a partial sectional view of the system taken along line 9-9 in FIG. 2.

FIG. 1 depicts the second baffle plate module 22 that is arranged immediately following the first baffle plate module 16. As illustrated in FIG. 9, the baffle plate module 22 contains a plurality of baffle plates: 22a, 22b, 22c, 22d, 22e, 22f, 22g, 22h, 22i. In the preferred embodiment, the baffle plates 22a-22i are tilted from 45 degrees to 70 degrees, with a most preferred angle of 60 degrees, similar to the baffle plates 16a-16i.

Returning to FIG. 1, the baffle plate modules 16 and 20 may be manufactured independently and then inserted into the container. The baffle plate modules 16, 20 can then be attached to the container via conventional methods such as welding means, nuts and bolts means, etc. Also included in the embodiment shown in FIG. 1 is the overflow weir 24, with the overflow weir 24 having an opening at its top end, which in the embodiment shown in FIG. 1, the opening is approximately four feet wide. The fluid flow will occur through the opening area denoted by the numeral 26. The opening 22 in turn leads to the mixing compartment that will be described later in the specification.

The bottom 6 contains a means for conveying 30 the solids to an exit line 32. In the preferred embodiment, the conveying means 30 will be an auger, and in the most preferred embodiment, the conveying means 30 is an auger blade without the inner shaft i.e. spiral blade. The shaftless spiral blade is commercially available from Martin Sprocket & Gear, Inc. under the name Shaftless Screw Conveyor. Hence, with the rotation of the blade via motor 33, the solids are advanced to the exit 32. Additionally, in the preferred embodiment the motor 33 will be controlled by a variable frequency drive (VFD) so that the speed of rotation may be varied. Thus, the operator may vary the speed of rotation so that the spiral blades may convey more solids to pumps 36 and 38 (in the case of increasing rotation speed), or alternatively convey less solids to pumps 36 and 38 (in the case of decreasing rotation speed). In other words, by increasing rotation, more solids are delivered to the cyclones via pumps 36 and 38, and by decreasing rotation, less solids are delivered to the cyclones via pumps 36 and 38. The operator may vary the speed according to the particular processing rate needs and system requirements of specific separation jobs. In the preferred embodiment, the motor is an electric motor that is commercially available from Marathon Inc. under the name Electric Motor.

As those of ordinary skill in the art will recognize, the fluid and solids collected from the exit 32 may be referred to as a slurry. It is desirable to separate the fluid from the solids. A dual object of the present invention is to produce solids that are essentially free of water and produce a fluid that is essentially free of solids.

In accordance with the teaching of this invention, the slurry being forced from the exit 32 are directed to a separating means 34, which in the preferred embodiment comprises a bank of hydrocyclones 34a and a linear shaker 34b. The hydrocyclone is commercially available from Krebs Engineering, Inc. under the name Cyclone, and as noted earlier, the linear shaker 34 is commercially available from Fluid Systems, Inc.

Thus, the pump 36 will receive the mixture of solids and fluid and pump it to the separator means 34 via the output line 36a wherein the separator means 34 will separate the larger solids and debris that are screened and discarded to the bin 11. It should be noted that the tandem cyclone 34a and linear shaker 34b operation will be described in greater detail later in the application.

The liquid output from the cyclone separator means 34a is directed back into the container 4 via the line 164a, into trough seen generally at 37, and into initial settling compartment 8. With reference to the linear shaker 34b, the fluid denoted by the BB arrows that falls through the shaker screen is directed into the top open area of the container 4 and in turn into the baffle plate modules. Therefore, the fluid is continuously cycled through the process, as noted earlier. The pump 36 is commercially available from Mission Inc. under the name Centrifugal Pump. In the preferred embodiment, the pumps are driven by an electric motor, and therefore, the pumps with the operatively associated driver motors may be referred to as electric pumps. The electric motor is commercially available from Marathon Inc. under the name Electric Motor. It should be noted, however, that it is within the scope of the present invention to have hydraulic powered pump means and/or diesel powered pump means.

A second electric pump 38 is also shown, with the second pump 38 being essentially identical to the first pump 36. The operator may choose pumps with specific capacities. As by example and for illustration purposes only, pump 36 may be a six inch suction and a five inch discharge and pump 38 may be a six inch suction and a five inch discharge. The second pump 38 is added so that the output capacity is increased in the case where the quantity and processing rate of the fluid stream is important. In other words, when the output rate from the system 2 needs to be increased, the second pump 38 can be utilized to increase the processing rate. The second pump 38 receives as an intake from the point denoted at 38a which is downstream of the intake for first pump 36. At the point 38a, the solids tend to be smaller in diameter since the solids are collected at a point (38a) in the container where the larger solids have already been separated.

The second pump 38 will pump the slurry to the second separator means 40 that includes the tandem cyclone separator 40b and the linear shaker 40a. The separator means 40 will process the fluid stream in a similar manner as with the separator means 34. The liquid output from the cyclone separator means 40b is directed back into the container 4 via line 164b, the trough 37 and into initial settling compartment 8. With the reference to the linear shaker 40a, the fluid (denoted by the BB arrows) that falls through the shaker screen is directed into the top open area of the container 4, and in turn, into the baffle plate modules. Therefore, the fluid is continuously cycled through the process, as noted earlier As noted in FIG. 1, pump 36 receives the slurry from exit 32 and discharges to the separator means 34 via discharge line 36a. The pump 38 receives the slurry from exit 38a and discharges to the separator means 40 via discharge line 44.

The flow of the fluid stream enters through the scalping shaker 10 as denoted by the arrow 46. The fluid that flows through the screen of shaker 10 is denoted by the arrows BB. The arrows within container 4 represent the general fluid stream flow. As solids are knocked and separated from the fluid within the baffle plate module, the solids settle to the bottom and the conveyor means moves the slurry as denoted by the arrow 50. Note that the fluid flow is generally opposite the direction of the slurry flow.

Once the fluid stream has been processed through the container 4, the fluid stream will exit the overflow weir 24 via the opening 26 as denoted by the arrow 52. The overflow weir 24 will direct the fluid stream into the mixing compartment 54. The mixing compartment 54 will contain mixing blades. The mixing hopper 56 is also operatively associated with the mixing compartment 54, with the mixing hopper 56 allowing for the introduction of bulk materials, chemical additives, and so on as is well understood by those of ordinary skill in the art.

The mixing compartment 54 has contained therein a pair of mixing propellers 98, 100 for mixing additives and/or bulk material, for instance, into the fluid stream. The additives can be added via the mix hopper 56 wherein the mix hopper 56 is fed into the line 82 that in turn discharges into the mixing compartment 54.

A pump means 58 will be operatively associated with a first intake line 60, with the first intake line being operatively associated with the container at the second end adjacent the overflow weir 24. The pump means 58 is commercially available from Mission Inc. under the name Centrifugal Pump. The intake line 60 suctions from the fluid stream that has been processed through the system. The pump means 58 will have a second intake line 62, with the intake line 62 being positioned to suction from the mixing compartment 54.

The pump means 58 will have a first discharge line 64, with the first discharge line leading into the mixing compartment 54. The first discharge line 64 will have operatively associated therewith output jet nozzles 66 which are commercially available from Halco Inc. under the name Mud Guns. Thus, the pump means 58 will be able to suction from the container via line 60 essentially clean fluid and pump into the mixing compartment via line 64, with the mud guns 66 allowing for the jet mixing of the fluid stream within the compartment 54. The pump 58 will also be able to pump from the mixing compartment and then discharge through the mud guns 66.

A valve means 68 for opening and closing the line 60 is included as well as a valve means 70 for opening and closing the line 64. A second discharge line 72 may be included, with the line 72 having a valve means 74 for opening and closing the line 72. The line 72 may discharge to a storage bin, for instance.

The system 2 will also contain the electric pump means 76, with the pump means 76 having a suction intake line 78 that suctions from inside the mixing compartment 54. The pump means 76 is commercially available from Mission Inc. under the name Centrifugal Pump. The pump means 76 will have a discharge line that branches into three separate lines, namely a first discharge line 80 (same as line 64?) that leads to the mud guns 66 previously described, a second discharge line 82 that leads to the mixing hopper 56, a third discharge line 83 to the mixing compartment and discharge line 83 to the mixing compartment and discharge line 84. The valve means 86 is included for directing the discharge stream to line 64, or to simply close the line. The discharge line 84 contains valve means 88 for opening and closing line 84 and discharging to a storage bin, for instance. Valve means 89 is included for opening and closing line 82.

Figure 2:
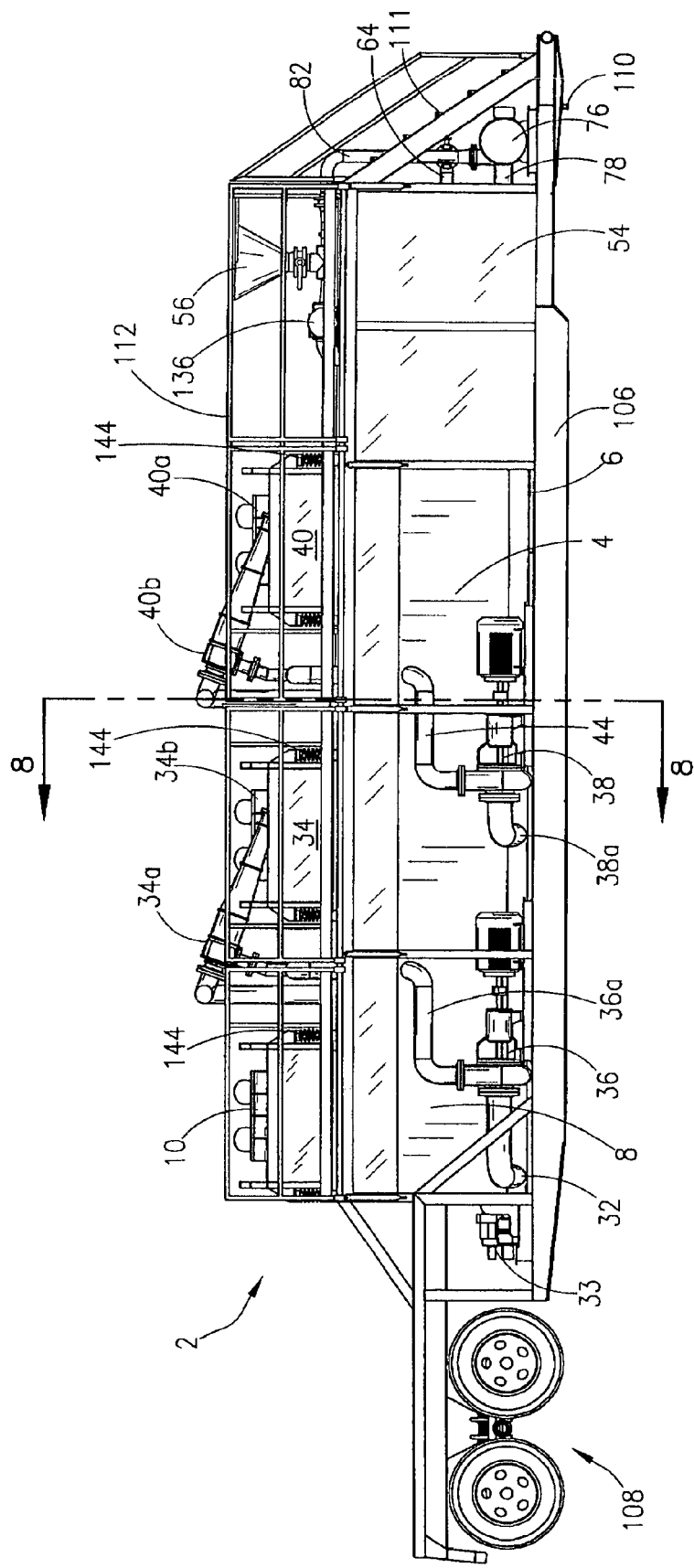
FIG. 2 is a side perspective view of the preferred embodiment of the present invention.

Referring now to FIG. 2, a side view of the preferred embodiment from FIG. 1 will now be described. It should be noted that like numerals appearing in the various figures will refer to like components. As noted earlier, the container 4 consist of a V-shaped vessel 4, with the scalping shaker 10 mounted above the initial settling compartment 8. The first baffle plate module 16 and second baffle plate module 22 are positioned within the vessel 4. From the second baffle plate module 22, the fluid stream will exit via the exit 26 (not shown) into mixing compartment 54 as previously described.

The slurry that is being collected at the bottom of the vessel will be conveyed via the conveying means 30 (not shown in FIG. 2) for conveying the solids from one end to the other end, which in the preferred embodiment is a spiral blade, as noted earlier, and is similar to an auger without the inner shaft.

FIG. 2 also depicts the first electric pump means 36 that collects the slurry exited from the bottom of the vessel via the conveyor means. Hence, the pump means discharges to the line 36a which in turn leads to the hydrocyclone separator 34a (also referred to as cyclone separator). As noted earlier, the cyclone separator 34a is commercially available from Krebs Engineers, Inc. under the name Krebs Cyclone.

As is understood by those of ordinary skill in the art, the cyclone separator 34a receives the slurry and will separate the solids from the fluid within the slurry. The cyclone separator works particularly well in separating sand and silt from fluid streams. The underflow or solids discharged out of the cyclone is then screened by the linear shaker 34b in order to dewater or dry the discharged solids before they are discarded off the side of the tank to the bin 11. The overflow or fluid discharge out of the cyclone 34a is discharged into the trough 37 that carries it back to a discharge point underneath the linear shaker 10 which in turn is delivered to the initial settling compartment 8. Thus, the solids are disposed of to a bin 11 while the fluid is conveyed back to the vessel, and in particular, back into the baffle plate modules 16, 22.

In the embodiment illustrated, the mixing compartment 54 is integrated onto the same frame together with the vessel 4.

The embodiment shown in FIG. 2 also contains the electric pump means 76 that pumps to the line 64 or line 82. The pump 76 may also be used to pump from the mixing compartment 54 via line 84 in the event the operator wishes to pump the fluid stream out of the mixing compartment 54.

The system has as a frame 106 to which all of the previously mentioned components are attached. As part of the frame, a set of wheel means 108 for transporting the system may be included. The frame may also include a trailer hitch device (shown generally at 110), with the trailer hitch device being capable of use with a vehicle (such as an 18-wheeler) so that the entire system may be hauled from one location to another location. In another embodiment, components may be attached to a frame, and the frame can be lifted with a crane or winch truck, so that the system may be transported via a ship or vessel in remote environments. As noted earlier, an advantage of the present system is the modularity of the system and the ability to transport the system in a package that is compact and condensed.

Also included will be the stairs 111 that an operator can use to mount the system. FIG. 2 also depicts the hand railings 112 for use by individuals while working, inspecting, monitoring, and/or repairing the system.

Figure 3:
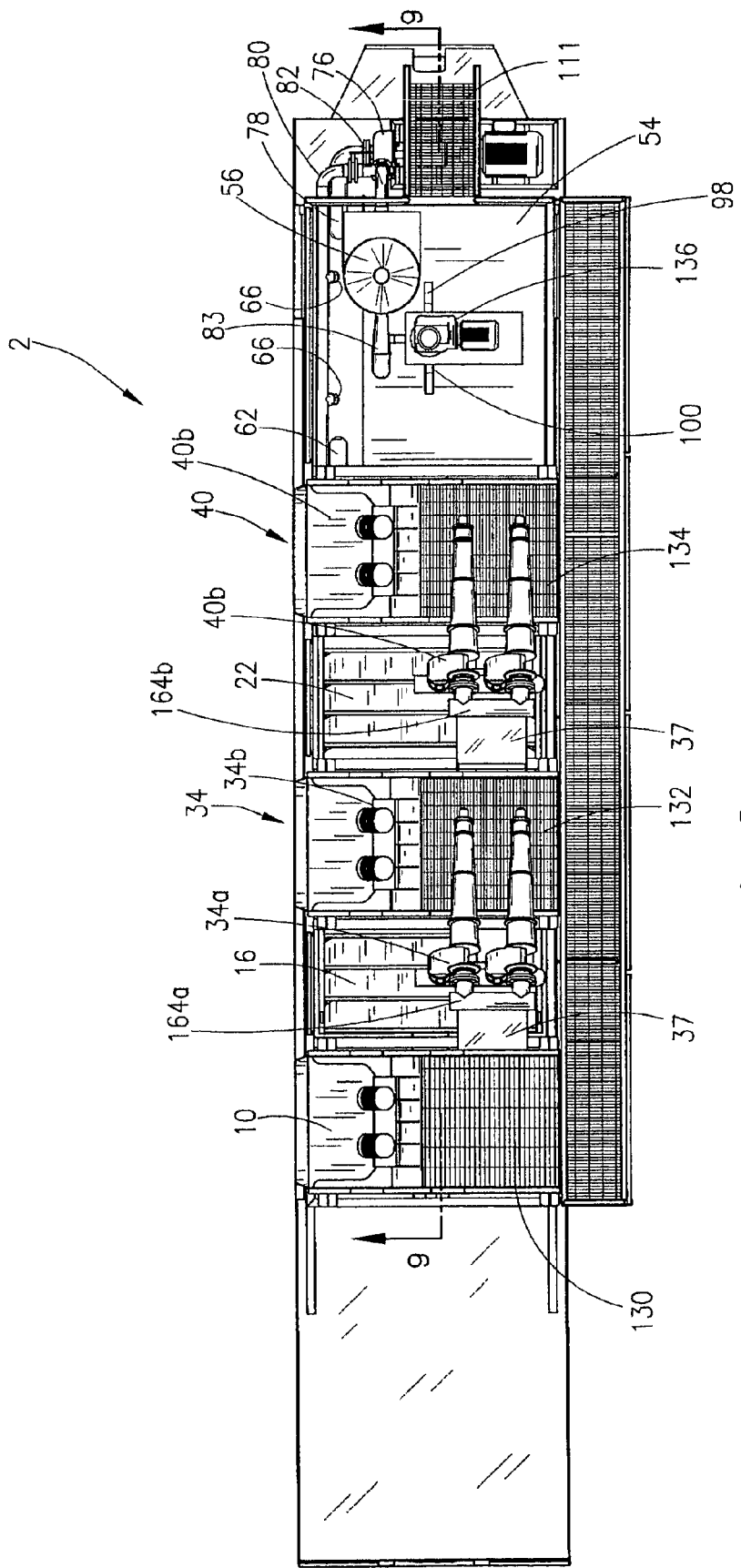
FIG. 3 is a top perspective view of the preferred embodiment of the present invention as seen in FIG. 2.

With reference to FIG. 3, a top view of the preferred embodiment depicted in FIG. 2 will now be described. The scalping shaker 10 will make a first separation (cut) of solids from the fluid stream. The fluid will then descend from the wire mesh screen 130 of shaker 10 to the settling compartment 8. As noted earlier, the fluid flows to the first baffle plate module 16 and then into the second baffle plate module 22.

The solids will segregate to the bottom as previously described. Thus, the pumps 38 and 36 will pump the slurry to the cyclones 34a and 40b which will act to further separate the solids from the fluid stream. The liquid output from the cyclone 34a will be fed via line 164a to the trough 37 back into the vessel for continuous processing. The liquid output from the cyclone 40b will be fed via line 164b to the trough 37 back into the vessel for continuous processing. The solids from the cyclone 34a will be directed to the linear shaker 34a, and in particular to the wire mesh screen 132 for dewatering the solids. The solids from the cyclone 40b will be directed to the linear shaker 40a, and in particular with the wire mesh screen 134 for dewatering the solids.

FIG. 3 also illustrates the placement of the mixing compartment 54. As shown, the mixing hopper 56 is placed above the mixing compartment 54 for positioning the entry of any additives into the compartment. The additives enter the hopper 56 and then the mixer 136 with blades 98, 100 will mix the components as necessary. The eurodrive mixer 136 is commercially available from Del Corporation under the name Mixer. An advantage of the present invention is that fluid that is cleaned as per the novel method can then be used as the mixing fluid within the mixing compartment 54.

Figure 4:
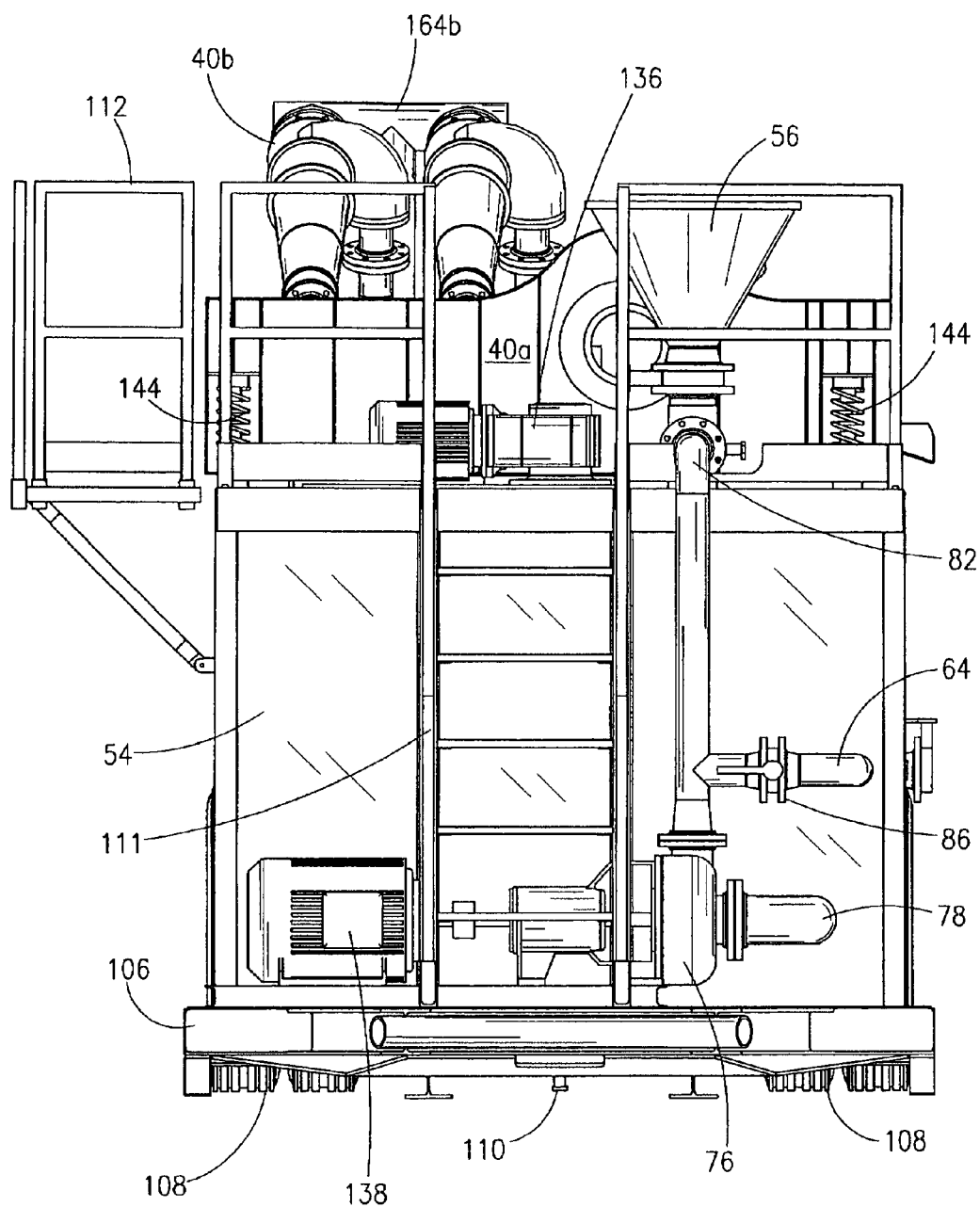
FIG. 4 is a front perspective view of the preferred embodiment illustrated in FIG. 2.

In FIG. 4, the drawing illustrates the system of FIG. 2 in a front view. Thus, FIG. 4 illustrates the pair of cones that make up the cyclone separators 40b and the linear shaker 40a. The eurodrive mixer 136 is depicted positioned on top of the mixing compartment 54. The mixing hopper 56 is shown, along with the discharge line 82. The pump 76 is shown having the discharge line 82 extending therefrom. The pump motor 138 is shown, with the pump motor being an electric drive in the most preferred embodiment. FIG. 4 also depicts the wheels 108, stairs 111, and handrails 112 for a walk way are also included.

Figure 5:
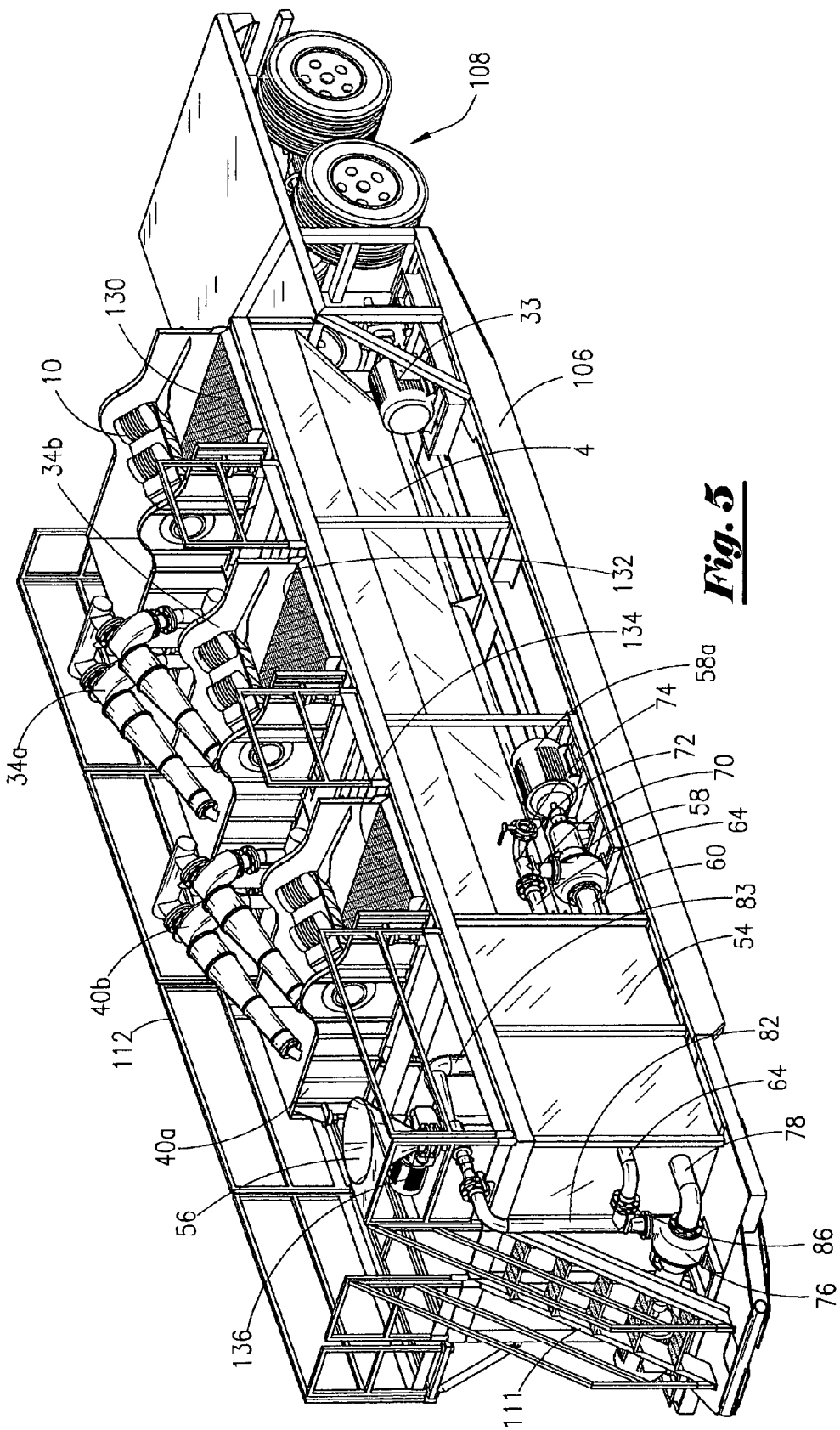
FIG. 5 is a three dimensional perspective view of the preferred embodiment of FIG. 2.

Referring now to FIG. 5, a perspective view of the preferred embodiment of FIG. 2 will now be described. The FIG. 5 depicts the scalping shaker 10 that is positioned above the initial settling tank 8. The fluid stream then flows into the first baffle plate module 16 and into the second baffle plate module 22 as previously noted. In the preferred embodiment, the conveyor means will be rotated via an electric motor 33 so that the speed of rotation of the motor's shaft can be varied which in turn will vary the speed of rotation of the spiral blade. By varying the speed of rotation of the spiral blade, the concentration of solids conveyed by the spiral blade can vary. The fluid containing the solids will be delivered to the cyclone separator 34a via the pump 36 and the pump 38 (pumps 36 and 38 are not shown in this view) will pump the slurry to cyclone separator 40b as noted earlier.

Once the fluid stream exits from the baffle plate module 22, the operator may direct the fluid stream into the mixing compartment 54. The fluid stream exiting the second baffle plate module 22 is essentially free of suspended solids. Generally, the system will remove solids from five (5) microns and larger from the fluid system.

Hence, the operator may wish to condition the fluid by adding certain material so that the fluid stream has certain desirable properties. For instance, if the operator is using the fluid stream as a drilling fluid, the operator may wish to add chemical additives to inhibit the swelling of clays, or to simply weight the fluid so that the column of fluid within the well bore exerts a greater hydrostatic pressure. Regardless of the specific application, the operator may mix the bulk material and/or additives by pouring the additives into the hopper. The fluid stream can be channeled into the mix compartment 54 via the pump means 58. It should be noted that FIG. 5 depicts the pump means 58 and the electric drive motor 58a that drives the pump means 58 as is well understood by those of ordinary skill in the art. The intake line 60 is shown for pump 58 along with the output line 64 and the valve 74. Pump 76 can intake from line 78 and discharge to either line 64, line 84, or line 82. Valve means 86 will direct flow to line 64.

Figure 6:
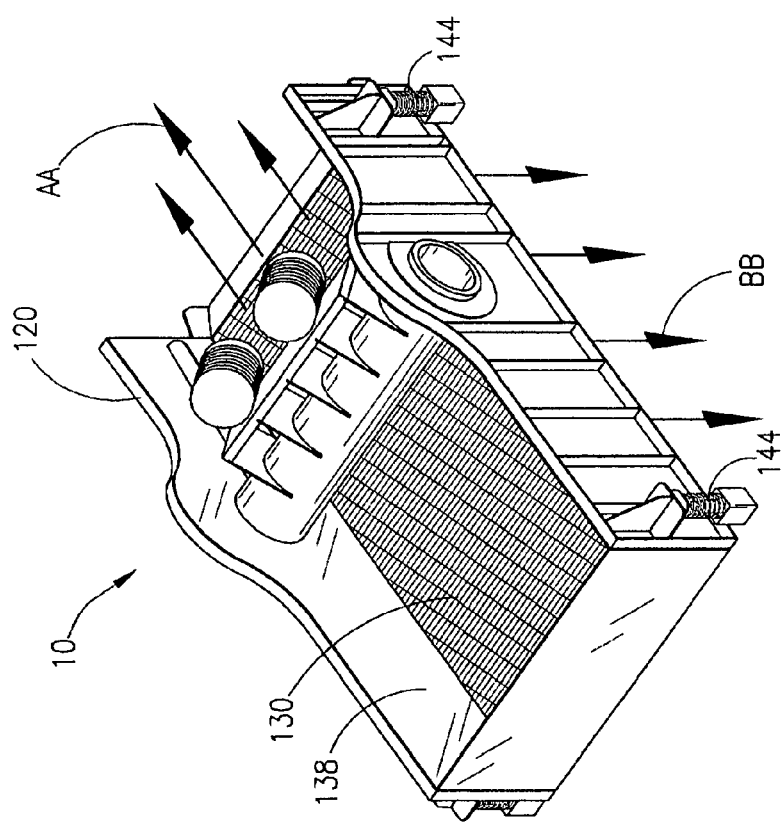
FIG. 6 is an illustration of the linear shaker of the present invention.

The linear shaker 10 will now be described. FIG. 6 is an illustration of the linear shaker 10. Basically, the scalping shaker 10 will receive a discharge of the slurry onto the wire screen 130, with the screen being a certain mesh i.e. opening. As understood by those of ordinary skill in the art, the shaker screen is vibrated thereby knocking and shaking the slurry so that the solids are caught on the top side of the screen and the fluid falls below. The screen is vibrated and oscillated at high frequencies as is well understood by those of ordinary skill in the art. In the preferred embodiment, the discharge is in two parts: the first part is the solids caught by the wire mesh screen with the flow off the screen 130 being denoted by the arrow AA, and wherein the solids are funneled to a bin; in the second part, the fluid stream falls through the wire mesh screen denoted by the arrow BB, and wherein the fluid stream can then be directed back into the baffle plate module. The frame of the shaker 120 is mounted via conventional means, such as welding or bolting, to the frame 107 of the system, with the chassis of the shaker having spring leg mounts 144 to attach the shaker and adsorb the vibrations as is well understood by those of ordinary skill in the art.

Figure 7:
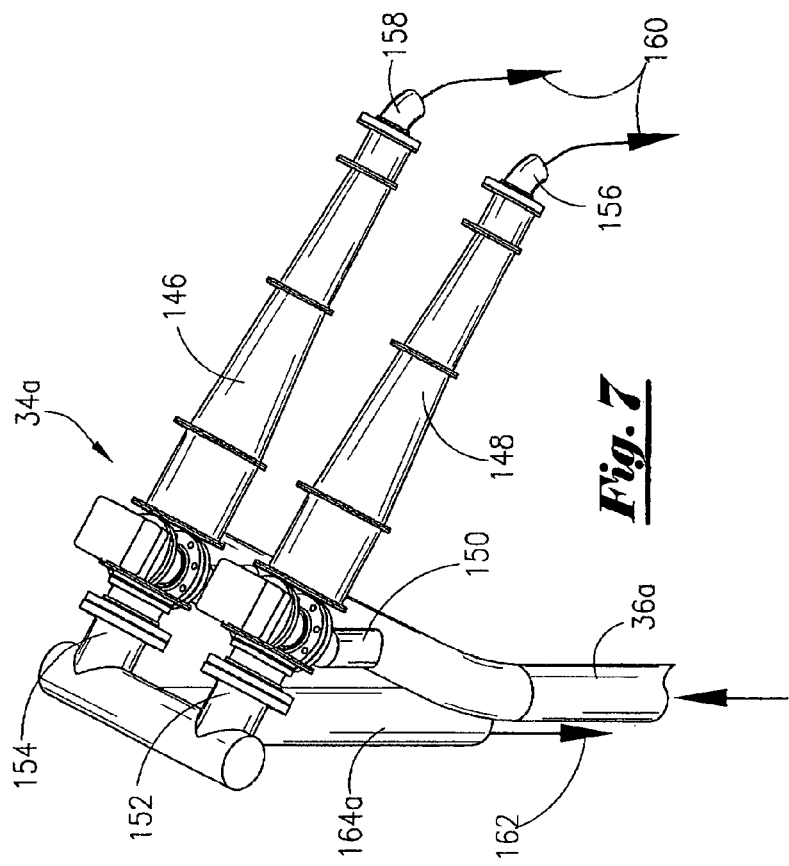
FIG. 7 is an illustration of the hydrocyclone of the present invention.

In FIG. 7, the cyclone 34a is shown. As shown, a pair of cones, namely 146, 148 are depicted. In accordance with the teachings of this invention, the multiple cones may be used depending on the desired flow rate being processed. Some embodiments will use a dozen cones. In the alternative, only a single cone may be used. Some factors in deciding the number and size of cones employed includes the processing rate, the desired separation diameter of the solids, the nature of the solids, etc. Hence, it is within the scope of this invention that a bank of cones may be used with an individual linear shaker.

Generally, the fluid stream with embedded solids enters through the inlets 150 via the line 36a. The fluid stream is injected into the cone under pressure. As is well understood by those of ordinary skill in the art, the cone shape container results in a centrifugal force created by the incoming fluid stream. The effect is to force solids to the inner wall of the cyclone. The cleaned liquid from the center of the swirling liquid mass flows out of the top section 152, 154 of the cyclone, and the solids spin downward to the outlets 156, 158. In the design of the present invention, the solids (denoted by the arrows 160) discharge to the wire mesh screens of the linear shakers as previously described. The fluid (denoted by arrow 162) is directed back into the vessel via the discharge line 164a, with the discharge line leading to the trough 37.

Figure 8:
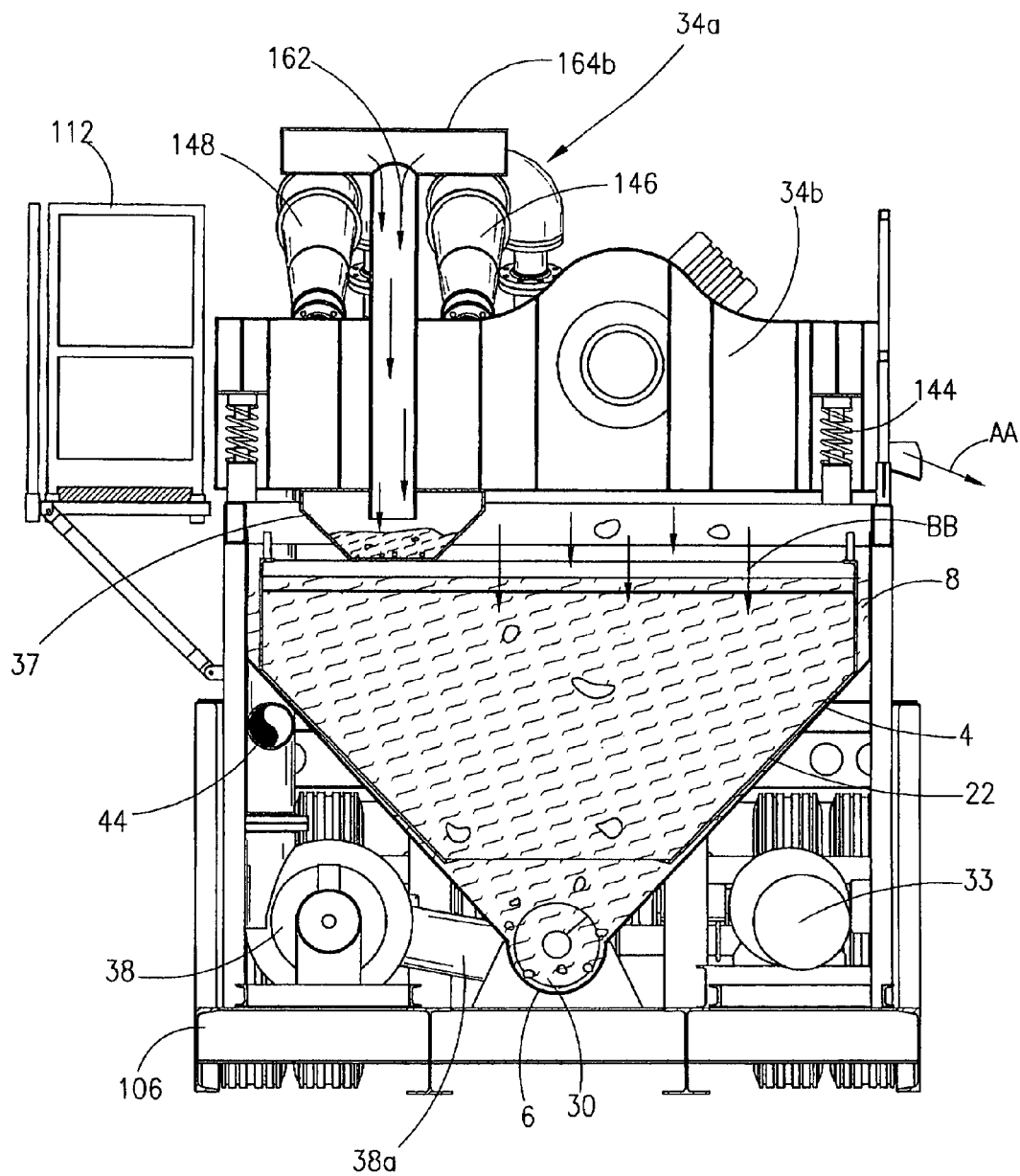
FIG. 8 is a cross-sectional view of the system taken along line 8-8 in FIG. 2.

FIG. 8 is a cross-sectional view of the system taken along line 8-8 of FIG. 2. Thus, the cyclone 40b is shown with the discharge line 164b discharging fluid (arrow 162) to the trough 37, with representative small diameter solids seen in the trough 37. The fluid with some suspended solids within the tilted baffle plate module 22 is also shown. FIG. 8 also depicts the fluid (denoted by arrow BB) that has fallen through the screen of the shaker 40a into the open top area of vessel which leads to the baffle plate module. The spiral blade 30 is also shown disposed at the bottom of the V-shaped container 4. The solids AA is shown being dispensed from the shaker 40a which will be deposited to the bin. The discharge line 44 from pump 38 is also shown. The container 4 mounted on the frame 106 is also depicted.

FIG. 9 depicts a partial cross-sectional view of the system taken along line 9-9 of FIG. 3. This view depicts the discharge line 36a from pump 36 to the cyclone 34a and the discharge line 44 from pump 38 to the cyclone 40b. The baffle plates of module 16 are denoted by the numerals 16a, 16b, 16c, 16d, 16e, 16f, 16g, 16h, 16i. The second baffle plate module 22 is also illustrated, with the baffle plates being denoted by the numerals 22a, 22b, 22c, 22d, 22e, 22f, 22g, 22h, 22i. The line 64 which contains the mud guns 66 is also shown. The shaftless spiral blade 30 is also pictured.

The intake line 62 which is inside the mixing compartment 54 is shown, with the intake line 62 being connected to the pump 58 (not shown in FIG. 9). Within the mixing compartment 54 is the mixing blades 98, 100 that is driven by mixer 136. The mixing guns 66 are operatively associated with the discharge line 64. The open area 26 from the overflow weir 24 allows the fluid stream to enter the compartment 54, as previously stated. The mixing hopper 56 is also depicted.

One of the features of the present invention is the modularity of the components allows for multiple shakers and cones to be placed upon the vessel 4. The rate at which the operator seeks to clean a fluid stream will, at least in part, determine the number of separating means that are ultimately employed. Hence, with very large processing volumes, the operator can place a scalping shaker and two tandem cyclone-shakers (as shown in the FIGS. 1 through 9 of this application). Alternatively, the operator can place a scalping shaker and three tandem cyclone/shakers. In another option, the operator can place a scalping shaker and only a single tandem cyclone/shaker.

As an example of the number of separators and pumps required, the cyclone separator pump may be sized to feed a bank of cyclones capable of handling a flow rate of 2000 gallons per minute (gpm). If more than 1500 gpm is required however, it is recommended that a third linear shaker, 40*a*, be used in order to split the cyclones so that they discharge over two linear shakers in order to sufficiently dewater the underflow. If flow rates greater than 2000 gpm are desired then another feed HCFP2-pump 38 can be installed directly behind feed HCFP1 pump 36 and feed a second bank of hydrocyclones, 40*b*, capable of making a particle size cut that is the same or finer than cyclone 34*a*. An important feature to the cleaning efficiency of the system is the ratio of cleaning rate to flow rate through the system. If the fluid stream is pumped to linear shaker 10 at a rate of 500 gpm and is processed through the hydrocyclones 34*a* and 40*b* at a rate of 2000 gpm, then the cleaning to flow ratio is 4:1. The system can be set up to maximize the cleaning to flow ratio simply by increasing the number of cyclones and linear shakers and properly sizing the feed pumps.

Figure 10:
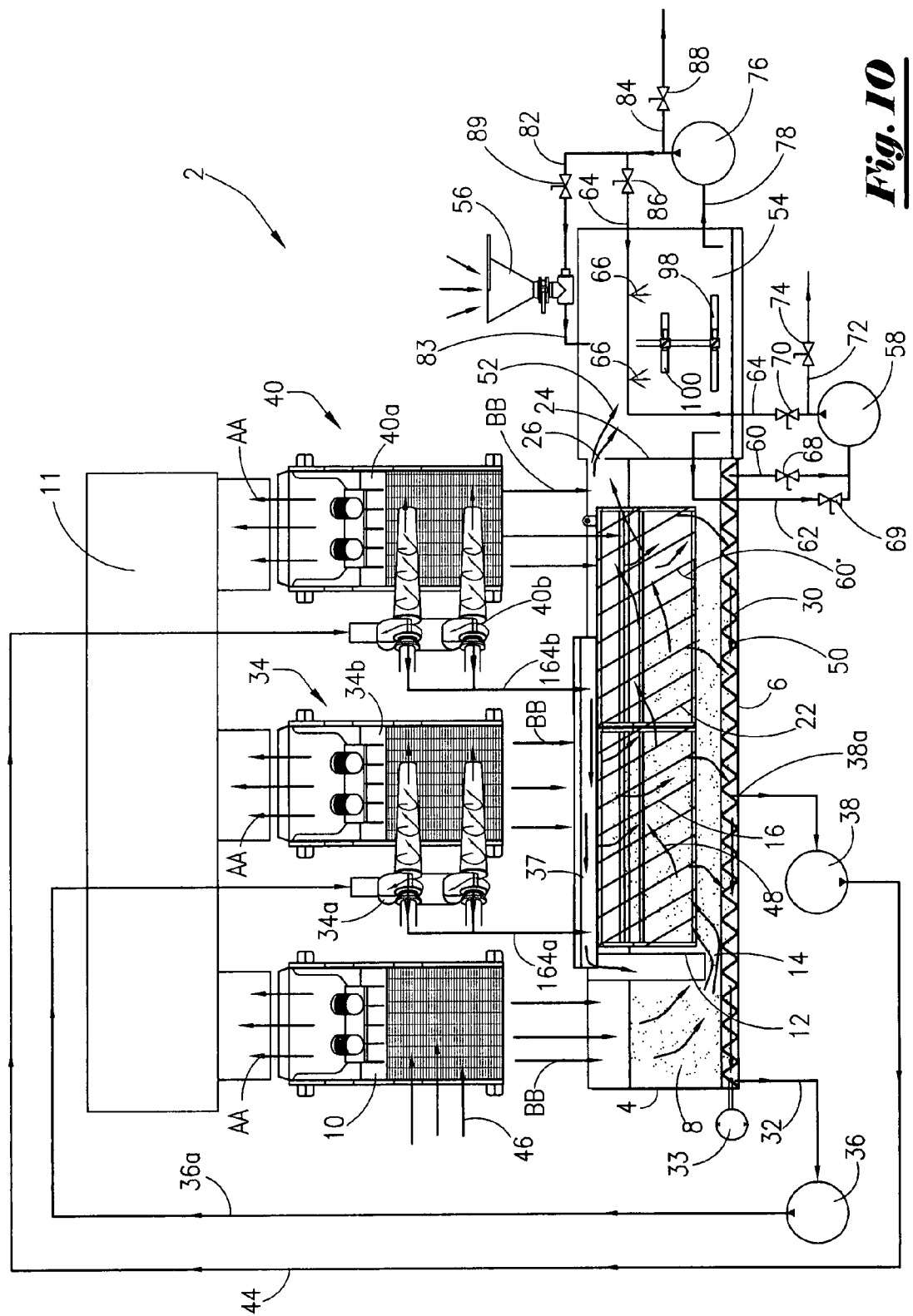
FIG. 10 is a schematic diagram of the most preferred embodiment of this invention.

A second embodiment is shown in FIG. 10, which is the most preferred embodiment of the present invention. This second embodiment of FIG. 10, like the embodiment of FIGS. 1 through 9, has applications for oil and gas well drilling, utility construction, waste water treatment, tank cleaning, waste minimization, dredging, tunneling, etc. In short, any process requiring the removal of heavy solids from a fluid stream.

In the preferred embodiment of FIG. 10, the fluid stream enters tank 4 through linear shaker 10 where larger solids and debris are screened and discarded off the side of the tank. Any fluid and solids passing through the screen on linear shaker 10 enter tank 4 and must flow under underflow weir/"possum belly" 12. Screw conveyor (shaftless or with shaft) 30 conveys any solids that settle to the bottom of tank 4 at this point in the opposite direction of the fluid stream flow to hydrocylcone feed pump 36 suction. Any solids which stay in suspension and continue on with the fluid stream enter the tilted plate baffle system (16 and 22) which forces the solids to settle to the bottom of tank 4 by the solids striking the tilted plates, decreasing their velocity and allowing gravity to force them to the bottom so that they are left behind by the fluid stream. When these solids settle to the bottom of tank 4, screw conveyor (shaftless or with shaft) 30 conveys them back to hydrocylcone feed pump 36 suction. Hydrocylcone feed pump 36 pumps the settled solids slurry to hydrocyclones 34*a*. Hydrocyclones 34*a* is a bank of hydrocyclones that has been properly sized to remove the undesirable solids from the fluid stream. The underflow or solids discharge out of hydrocyclones 34*a* is then screened by linear shaker 34*b* in order to dewater or dry the discharge solids before they are discarded off the side of the tank. The overflow or fluid discharge out of hydrocyclones 34*a* is discharged into a pipe that carries it back to a "possum belly" that fills and overflows over the tilted plate baffle system (16 and 22). Any suspended solids not removed on the first pass through hydroclones 34*a* will settle, screw conveyor (shaftless or with shaft) 30 will convey them to hydrocylcone feed pump 36 suction, and hydrocylcone feed pump 36 will pump them to hydrocyclones 34*a*. Any solids remaining will continue in this cycle until they are finally removed by hydrocyclones 34*a*, screened by linear shaker 34*b*, and discarded off the side of the tank.

Typically, lighter solids will take longer to settle; therefore, the suction of hydrocyclone feed pump 38 is located farther down in the flow stream, past underflow weir/"possum belly" in order to remove these lighter, finer solids. Hydrocyclone feed pump 38 pumps the settled slurry to hydrocyclones 40*a* is a second bank of hydrocyclones properly sized to remove the finer solids left in the fluid stream. The underflow of hydrocyclones 40*a* is then screened by linear shaker 40*a*, dewatered, and discarded off the side of the tank. The overflow of hydrocyclones 40*a* is discharged into a pipe and is carried back to the same "possum belly" as the overflow of hydrocyclones 34*a* and flows through the tilted plate baffle system (16 and 22) again.

The fluid stream, which continues to flow through tilted plate baffle system (16 and 22) to the end of tank 4 opposite the location of linear shaker 10, may exit tank 4 by one of two methods chosen by the operator. In the first method, the flow stream exits tank 4 by overflowing overflow weir 26 into mixing/chemical treatment tank 54. As mixing/chemical treatment tank 54 fills with the clean fluid from tank 4, then mixing pump 76, mixing hopper 56, mixer 136, and mud guns 66 can be used to mix additional fluid in the case of drilling mud or they can be used to chemically treat the fluid in the case of tank cleaning where further treatment of the fluid by a centrifuge may be required. Once mixing and/or treatment has taken place transfer pump (58) may be used to transfer the fluid from mixing/chemical treatment tank 54 to wherever the operator may desire. The second method by which the cleaned fluid may exit tank 4 is by being pumped by transfer pump (58) into mixing/chemical treatment tank 54 through mud guns 66. Once mixing/chemical treatment tank 54 fills, clean fluid will overflow overflow weir 26 back into tank 4. Mixing pump 76, mixing hopper 56, mixer 136, and mud guns 66 may be used to mix additional fluid or chemically treat the clean fluid as in the first method. Transfer Pump 76 or a remote portable pump may be utilized to transfer the clean fluid from mixing/chemical treatment tank 54 to wherever the operator may desire.

As noted earlier, the key to the cleaning efficiency of the system is the ratio of cleaning rate to flow rate through the system. As per the teaching of this inventor, if the fluid stream is pumped to linear shaker 10 at a rate of 500 gpm and is processed through the hydrocyclones at a rate of 2000 gpm then the cleaning to flow ratio is 4:1. The system can be set up to maximize the cleaning to flow ratio simply by increasing the number of hydrocyclones and linear shakers and properly sizing the feed pumps. Systems capable of flow rates in excess of 3000 gpm are often utilized in large dredging applications.

Changes and modifications in the specifically described embodiments can be carried out without departing from the scope of the invention that is intended to be limited only by the scope of the appended claims and any equivalents thereof.

I claim:

1. A system for separating solids from a fluid stream, said system comprising:
   a first linear shaker device adapted to a container, said first linear shaker having a liquid output, and wherein said container includes a settling tank positioned to receive the liquid discharged from said first linear shaker's liquid output;

a baffle module positioned within said container, said baffle module situated to receive an output from said settling tank, said baffle module having a discharge opening;

an auger blade positioned at the bottom of said container, said auger blade adapted to convey the solids in a first direction;

a first pump member, said first pump member having an inlet and an outlet discharge, and wherein said inlet receives the solids from said auger blade;

a first cyclone separator receiving the discharge from said first pump member outlet discharge and delivers a first stream to a second linear shaker and a second stream to a possum belly container positioned within said settling tank, wherein said second linear shaker has a liquid output line directed to said settling tank;

a discharge line connected to said discharge opening from said first baffle module for discharging the fluid stream from said container;

and wherein once said possum belly container fills with said fluid stream, said fluid stream is directed from said possum belly container to said baffle module, and wherein said fluid stream within said possum belly container does not mix with said liquid discharge from said linear shaker in said initial settling compartment.

2. The system of claim 1 wherein said baffle module comprises a plurality of tilted baffle plates tilted at an angle between 45 degrees and 70 degrees.

3. The system of claim 2 further comprising a first weir positioned at the baffle module.

4. The system of claim 3 further comprising a second pump member, said second pump member having an inlet and an outlet, and wherein said inlet receives the solids from said auger blade and said outlet is directed to a second cyclone separator.

5. The system of claim 4 further comprising a mixing compartment operatively connected to said discharge line, said mixing compartment having a hopper and a mixing blade disposed therein.

6. The system of claim 5 wherein said container is mounted to a base frame, and wherein said base frame contains a set of wheels for mobile transportation.

7. An apparatus for separating solids from a fluid stream comprising:

a first shaker device for separating suspended solids from the fluid stream, said first shaker device having a fluid output to an initial settling compartment located within a container, said container having a V-shaped bottom;

a baffle plate module positioned within the container and receiving the output from said initial settling compartment, wherein the solids from said fluid stream fall to the bottom of the container;

a spiral blade positioned at the bottom of the container;

a means for rotating said spiral blade at a variable rate;

a first pump receiving the solids from the bottom of the container from said spiral blade, said first pump having an output line;

a cyclone means for receiving and separating the fluid from the solids with a centrifugal force, wherein said cyclone means discharges a first fluid to a possum belly container within said initial settling compartment and a first slurry to a second shaker device for separating said first slurry into a first solid waste stream and to a second fluid stream, and wherein said second shaker device discharges the second fluid steam to said baffle plate module;

an output line extending from said container;

a mixing tank, positioned to receive the output fluid stream from said output line from said container; said mixing tank having a hopper member operatively connected thereto, and wherein said mixing tank contains a mixing blade;

and wherein once said possum belly container fills with said first fluid, said first fluid is directed from said possum belly container to said baffle module, and wherein said first fluid within said possum belly container does not mix with said liquid discharge from said shaker devices in said initial settling compartment.

8. A method of treating a fluid containing solids comprising:

flowing the fluid into a first linear shaker for separating the fluid from the solids, said first linear shaker being associated with a container;

discharging the separated fluid into an initial settling compartment, said initial settling compartment being located within said container;

channeling the separated fluid under a possum belly container positioned within said initial settling compartment;

channeling the fluid into a second compartment, said second compartment containing a plurality of tilted baffle plates;

settling the solids to the bottom of the container;

conveying the solids to a first discharge pump;

pumping the solids from said discharge pump to a cyclone device in tandem with a second linear shaker;

discharging the fluid stream from said cyclone device into said possum belly container positioned within the initial settling compartment;

collecting the fluid stream within said possum belly container;

preventing the fluid within said initial settling compartment from mixing with the fluid stream within said possum belly container;

overflowing the fluid stream from said possum belly into said second compartment;

discharging a slurry stream from said cyclone device to said second linear shaker;

separating the fluid stream from said slurry stream with said second linear shaker;

discharging the fluid stream from said second linear shaker to said second compartment;

discharging the solids from said second linear shaker to a bin;

suctioning the fluid stream within said container into a mixing compartment, said mixing compartment adjoining said container;

mixing an additive into said fluid steam within said mixing compartment so that a new slurry is formed.

9. The method of claim 8 wherein the step of conveying comprises:

rotating a spiral blade and pushing the slurry at the bottom of the container in an opposite direction from the fluid flow;

increasing the rate of rotation of the spiral blade so that an increase in the solids is delivered to the first discharge pump.

10. The method of claim 9 wherein said first linear shaker includes a wire screen of 4 mesh.

11. The method of claim 10 wherein the step of suctioning from the container into the missing compartment includes suctioning from the container with a centrifugal pump and discharging to a line containing a mud gun and the method the step of mixing the additive into said fluid stream comprises:

introducing the additive through a mixing hopper, said mixing hopper operatively associated with the mixing compartment;

jetting the cleaned fluid from the container through said mud guns within the mixing compartment;

rotating a plurality of blades located within said mixing compartment.

12. The method of claim 11 further comprising: a second cyclone means with a second solid's output line, said second solid's output line being delivered to a third linear shaker; and a third solid's output line, said third solid's output line being delivered to said third linear shaker and the method further comprises:

discharging the fluid stream from said second cyclone means into the possum belly container within said initial settling compartment; and, discharging the solids from said second cyclone means to the third linear shaker.

13. The method of claim 12 wherein said step of conveying the solids includes providing a second discharge pump that discharges to said second cyclone means and wherein the step of rotating said auger blade at a variable rate includes pushing the solids to said second discharge pump.

14. The method of claim 13 wherein said tilted baffle plates are disposed at an angle of between 45 degrees to 70 degrees.

15. The method of claim 14 wherein the step of mixing the additive further includes providing a fourth pump means having a section line operatively associated with the mixing tank and a discharge line operatively associated with said hopper and the method further comprising:

pumping the fluid within said mixing tank to said hopper via the discharge line;

mixing the fluid with the additive in the discharge lien;

discharging the mixed fluid and the additive into said mixing tank.

* * * * *